D. COCKBURN AND D. MacNICOLL.
ENGINE STOP GEAR.
APPLICATION FILED JAN. 19, 1920.
1,346,590.
Patented July 13, 1920.
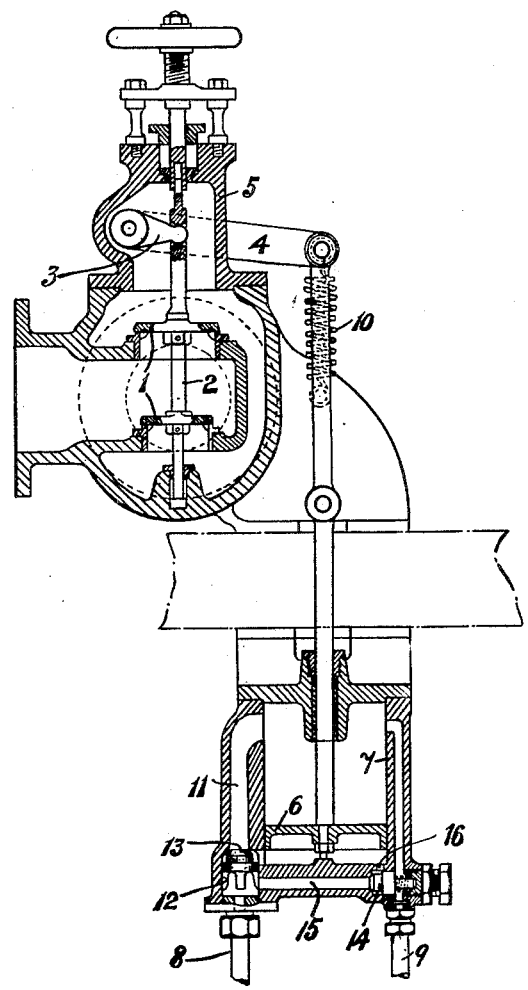

UNITED STATES PATENT OFFICE.

DAVID COCKBURN AND DONALD MacNICOLL, OF CARDONALD, NEAR GLASGOW, SCOTLAND.

ENGINE STOP-GEAR.

1,346,590.  Specification of Letters Patent.  Patented July 13, 1920.

Application filed January 19, 1920. Serial No. 352,534.

*To all whom it may concern:*

Be it known that we, DAVID COCKBURN and DONALD MACNICOLL, subjects of the King of the United Kingdom of Great Britain and Ireland, and residing at Cardonald, near Glasgow, Scotland, have invented a certain new and useful Improvement in Engine Stop-Gears, of which the following is a specification.

This invention relates to an improved engine stop gear including an emergency valve which automatically shuts off the steam supply to the engine in the event of failure of the forced lubrication system or drop of oil pressure or the absence of an overflow from a tank or of a surplus supply of oil from a pump or the like, which emergency valve can also be operated by hand or by a governor.

The emergency valve proper is operatively connected to a piston movable in a cylinder open to pressure fluid (*i. e.*, piped to the forced lubrication system or source of supply of oil), the cylinder having between its ends a by-pass connection controlled by an auxiliary piston.

The figure of the accompanying drawing is a vertical section of a construction according to the invention.

As shown, the emergency valve is formed as a balanced valve, in the particular instance as a double-beat valve 1, carried by a spindle 2 engaged by a lever arm 3 housed within the valve casing 5 and rigid with a lever arm 4 located externally of the casing 5 and operatively connected to a piston 6 movable in a cylinder 7 of which one end has a pipe connection 8 to the forced lubrication system or source of supply and the other end has an overflow connection 9.

Normally, the pressure of the liquid acting on the under face of the piston 6 maintains the levers 3, 4, and thereby the valve spindle 2 in such position that the valve 1 is held open, the pressure overcoming the action of a spring 10 (or a weight or the like) tending to close the valve.

On drop of pressure or failure of supply the spring 10 rocks the levers 3, 4 and displaces the spindle 2 in the direction to close the valve 1.

To accelerate the action of closing the valve and prevent the cylinder 7 from functioning as a dashpot there is provided a by-pass connection 11 between the ends of the cylinder 7, there being interposed in said by-pass connection 11 an auxiliary cylinder 12 in which is movable an auxiliary piston 13 serving when in raised position to close the by-pass 11, said second cylinder 12 being connected to the tank or source of supply.

The arrangement is such that the oil which is to act on the piston 6 enters the cylinder 12 by the pipe 8 before it reaches the cylinder 7 and thus first closes the by-pass.

Between the cylinder 12 and the overflow connection 9 is a passage 15 at the end of which remote from the cylinder 12 is fitted a spring-loaded valve 14 controlling the opening 16 to the underside of the piston 6.

As will be seen, on drop of pressure or failure of supply of oil the piston 6 will in any event fall. Also the auxiliary piston 13 falls and opens the by-pass connection so that the fall of the piston 6 is unimpeded.

The connection or connections between the cylinder 6 and the tank or source of supply may be controlled by a governor or by hand gear whereby to actuate the emergency valve.

We claim:—

In an engine stop gear, the combination with an emergency valve, a load tending to close said valve, a cylinder having a by-pass connection between its ends, said cylinder open to pressure fluid, a piston in said cylinder, an operative connection between said piston and said valve, an auxiliary cylinder interposed in said by-pass connection, and an auxiliary piston movable in said auxiliary cylinder and serving to control said by-pass connection.

In testimony whereof we have signed our names to this specification in the presence of two subscribing witnesses.

DAVID COCKBURN.
DONALD MacNICOLL.

Witnesses:
KATE FOTHERINGHAM,
ISABEL ROLLO.